United States Patent
Eubank et al.

(10) Patent No.: US 12,009,877 B1
(45) Date of Patent: Jun. 11, 2024

(54) MODIFICATION OF SIGNAL ATTENUATION RELATIVE TO DISTANCE BASED ON SIGNAL CHARACTERISTICS

(71) Applicant: Apple Inc., Cupertino, CA (US)

(72) Inventors: Christopher T. Eubank, Mountain View, CA (US); Tomlinson Holman, Cupertino, CA (US); Martin E. Johnson, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 209 days.

(21) Appl. No.: 16/937,433

(22) Filed: Jul. 23, 2020

Related U.S. Application Data

(60) Provisional application No. 62/896,202, filed on Sep. 5, 2019.

(51) Int. Cl.
| | | |
|---|---|---|
| H04S 7/00 | (2006.01) | |
| H04B 17/318 | (2015.01) | |
| H04R 3/12 | (2006.01) | |
| H04R 5/033 | (2006.01) | |
| H04R 5/04 | (2006.01) | |

(52) U.S. Cl.
CPC ............. *H04B 17/318* (2015.01); *H04R 3/12* (2013.01); *H04R 5/033* (2013.01); *H04R 5/04* (2013.01); *H04S 7/304* (2013.01); *H04S 2420/01* (2013.01)

(58) Field of Classification Search
None
See application file for complete search history.

(56) References Cited

U.S. PATENT DOCUMENTS

| | | | | |
|---|---|---|---|---|
| 8,976,986 | B2 * | 3/2015 | Angeloff | H03G 3/30 |
| | | | | 381/108 |
| 10,225,656 | B1 * | 3/2019 | Kratz | G06T 19/003 |
| 2017/0325045 | A1 * | 11/2017 | Baek | H04S 1/002 |
| 2021/0004201 | A1 * | 1/2021 | Munoz | H04S 7/304 |

OTHER PUBLICATIONS

Pack, Brad. "What is Loudness?" Sonarworks, Jun. 5, 2019, www.sonarworks.com/blog/learn/what-is-loudness. (Year: 2019).*
Schultz, Theodore J., "Improved Relationship Between Sound Power Level and Sound Pressure Level in Domestic and Office Spaces", American Society of Hearing, Refrigerating and Air-Conditioning Engineers, Inc. (ASHRAE), Mar. 1983, 182 pages.
Duraiswami, Ramani, et al., "High Order Spatial Audio Capture and its Binaural Head-Tracked Playback over Headphones with HRTF Cues", Audio Engineering Society Convention Paper 6540, Oct. 7, 2005, 16 pages.

* cited by examiner

*Primary Examiner* — James K Mooney
(74) *Attorney, Agent, or Firm* — AIKIN & GALLANT, LLP

(57) ABSTRACT

Spatializing audio can include determining a draw-away curve of an audio signal and modifying the draw-away curve based on a strength of the audio signal. The strength can be determined prior to spatializing the audio signal. The audio signal can be attenuated or modified based on the modified draw-away curve. The attenuated or modified audio signal can be spatialized. Other aspects are described and claimed.

20 Claims, 6 Drawing Sheets

MODIFICATION OF SIGNAL ATTENUATION RELATIVE TO DISTANCE BASED ON SIGNAL CHARACTERISTICS

CROSS-REFERENCE TO RELATED APPLICATION

This application claims the benefit of U.S. Provisional Patent Application No. 62/896,202 filed Sep. 5, 2019, which is incorporated by reference herein in its entirety.

FIELD

One aspect of the disclosure relates to modifying a relationship between audio strength and distance based on signal characteristics.

BACKGROUND

Sound strength (e.g., sound pressure level) as heard by a listener changes as a listener moves closer or farther from a sound source. In an open field, the change in sound strength is predominantly governed by the inverse square law, which characterizes the relationship between sound strength and distance away from the source—for every doubling of distance away from the sound source, the sound pressure level decreases 6 dB.

In an enclosed space, for example, a living room, cathedral, or concert hall, the relationship between sound strength and distance can be influenced by the inverse square law for a direct component of sound, and also by a reverberant sound component which can, in turn, be influenced by acoustic characteristics such as, but not limited to, geometry of the enclosed space (e.g., shape, length, height, volume of a room) and absorption of the room.

Audio signals can be spatialized by applying one or more head related transfer functions to the audio signals, thereby imparting spatial cues in resulting spatialized audio signals having sounds that, when played back to a listener, are perceived to come from one or more virtual locations.

SUMMARY

In computer spatial audio systems, the mathematical function or relationship that describes audio strength (e.g., sound pressure level) of a sound emitting object as it moves away from a listener or microphone can be referred to as a "draw-away curve". As mentioned, in open space, the relationship between strength and distance is dominated by the inverse square law, which can also be described as a 'direct component' of the sound. In a closed space, the draw-away curve can have a direct component, and a reverberant component.

In digital audio systems, dynamic compression (reducing loud sounds and amplifying quite sounds) can be used in the audio output signal processing chain. Such compression can a) prevent a loud sound from physically damaging hardware (e.g., speakers), b) present sound at a pleasant level, and c) control apparent differences between loud and soft sounds. Application of dynamic compression typically uses a "look ahead" in which the output signal is delayed by a certain amount of time, to give the processing algorithm time to gradually react to loud sounds (e.g., ramp a sound up or down) in a way that protects a listener, protects hardware, and prevents audible artifacts. Such a look ahead, however, can result in an unacceptable latency in the processing chain that spatializes the audio signal. Therefore it is extremely undesirable to apply look ahead dynamic compression to an audio signal after it has been spatialized. Furthermore, it does not help to perform look ahead dynamic compression prior to spatializing, because it is not known how loud the played back signal will be until after the signal has been spatialized (at which point the draw-away curve has been applied).

Magnitude (e.g., a physical loudness of a sound source) and perceived loudness characteristics of an audio file, an audio signal, or a sound source, can be calculated both offline and/or at runtime. Magnitude characteristics can be determined, for example, as root mean squared (RMS), peak loudness, or other known loudness measure, over one or more time frames or periods of an audio signal. Other magnitude characteristics can be determined.

Perceived loudness characteristics can be determined, for example, by applying an A-weighting or loudness k-weighted relative to full scale (LKFS) to the audio signal. The relationship between distance and sound strength of an audio signal (e.g., a draw-away curve, or attenuation with respect to distance) can be modified based on these pre-spatialized signal characteristics. The audio signal can be attenuated or modified according to this modified relationship to prevent the spatialized signal from an individual or group of sound objects from exceeding pre-determined mathematical magnitudes or perceptual loudness metrics. This, in turn, can protect hardware, present sound at an acceptable level, and provide a pleasant user experience without audible artifacts.

In one aspect of the present disclosure, a method for processing audio includes determining a relationship, based on one or more acoustic characteristics of the virtual space, between a) the strength of the audio signal of a sound source as perceived by a listener, and b) distance between the sound source and the listener in a virtual space. Such a relationship can be represented as a draw-away curve. In another aspect, a gain or attenuation of the audio signal can be determined relative to the distance between the sound source and the listener in the virtual space. Regardless of how the relationship is characterized (either as strength relative to distance, or attenuation relative to distance), the audio signal can be attenuated based on the relationship, to determine a modified strength of the audio signal.

Strength of the audio signal can be calculated prior to spatialization of the audio signal. The relationship between strength and distance can be modified based on the calculated strength of the audio signal, by decreasing or increasing the strength of the audio signal (or attenuation of the audio signal) at one or more distances between the sound source and the listener, resulting in a modified relationship (e.g., a modified curve).

A strength (e.g., an attenuation) of a modified audio signal can be determined based on the modified relationship and a current distance between the sound source and the listener in the virtual space. For example, the modified draw-away curve or modified attenuation level can be applied to the audio signal based on the current distance (which can be determined by tracking the sound source position and listener position in virtual space) resulting in the modified audio signal. In such a manner, the audio signal can be attenuated, resulting in a modified audio signal with a different strength than if the original curve was to be applied to the audio signal. The modified audio signal can sound less loud, as is the case in nature when a listener moves farther from a sound source.

The attenuated audio signal can be spatialized based on a current position of a listener and a current position of the sound source in the virtual space, with one or more head related transfer functions, resulting in a left spatialized audio signal and a right spatialized audio signal. The spatialized signals can be used to drive a left speaker and a right speaker of a headphone set, whereby the signals are converted to sound that is perceived by the listener to contain the sound source at the current sound source position (or virtual position) in the virtual space.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below and particularly pointed out in the Claims section. Such combinations may have particular advantages not specifically recited in the above summary.

BRIEF DESCRIPTION OF THE DRAWINGS

Several aspects of the disclosure here are illustrated by way of example and not by way of limitation in the figures of the accompanying drawings in which like references indicate similar elements. It should be noted that references to "an" or "one" aspect in this disclosure are not necessarily to the same aspect, and they mean at least one. Also, in the interest of conciseness and reducing the total number of figures, a given figure may be used to illustrate the features of more than one aspect of the disclosure, and not all elements in the figure may be required for a given aspect.

DETAILED DESCRIPTION

Several aspects of the disclosure with reference to the appended drawings are now explained. Whenever the shapes, relative positions and other aspects of the parts described are not explicitly defined, the scope of the invention is not limited only to the parts shown, which are meant merely for the purpose of illustration. Also, while numerous details are set forth, it is understood that some aspects of the disclosure may be practiced without these details. In other instances, well-known circuits, structures, and techniques have not been shown in detail so as not to obscure the understanding of this description.

Figure 1:
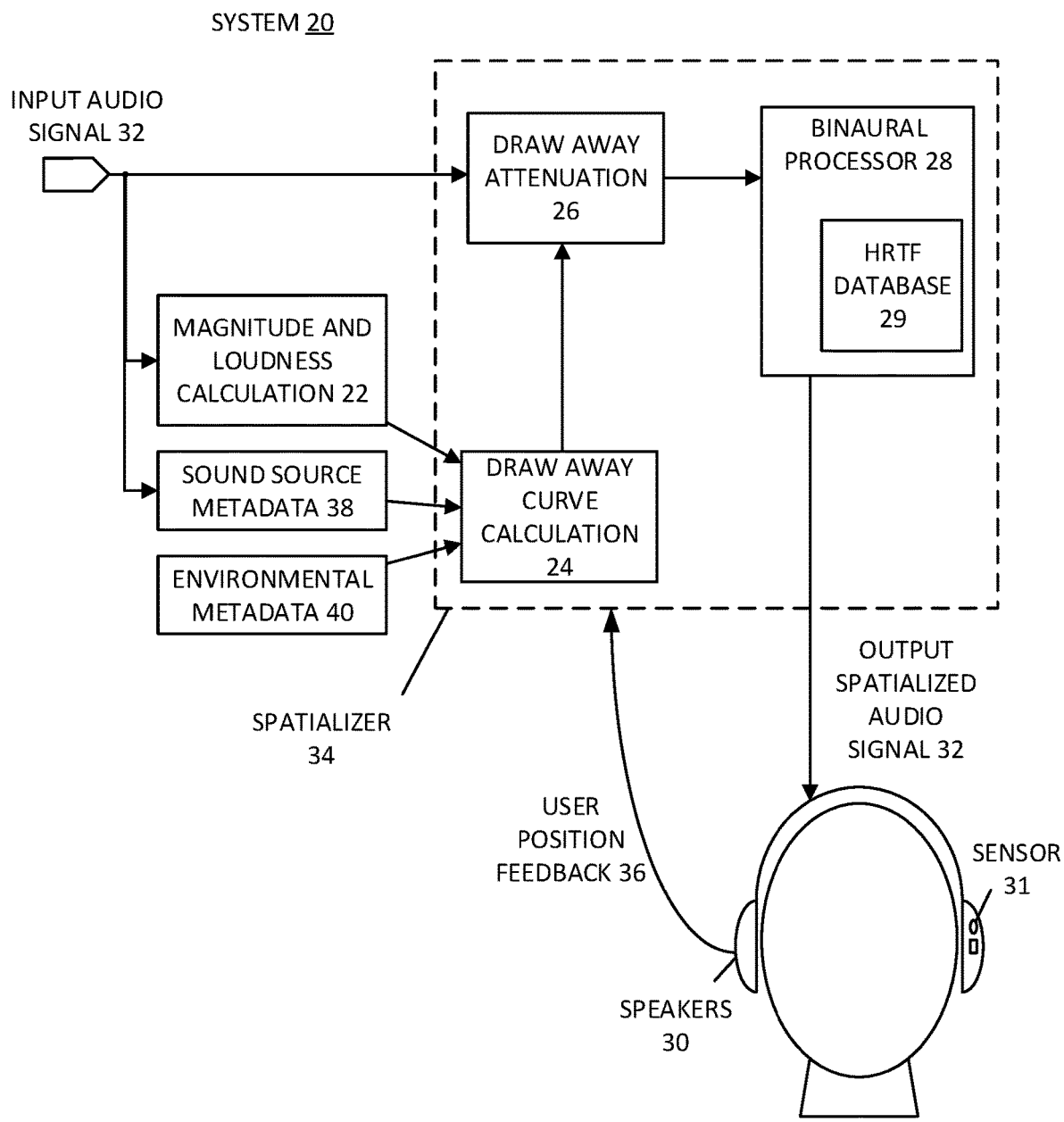
FIG. 1 shows a process and system for spatial audio processing that modifies a draw-away curve, according to one aspect.

Referring now to FIG. 1, an audio processing system 20 is shown that can spatialize an input audio signal 32 using magnitude and/or loudness calculations to dynamically modify the relationship between distance and strength of the audio signal. The magnitude and loudness calculations can be calculated from the audio signal, prior to spatialization of the audio signal at block 34. Distance here can describe a virtual distance in a virtual space between a listener and a sound source. The audio processing system can be used for spatial audio applications.

A magnitude and loudness calculation block 22 can calculate strength of an audio signal of a sound source. The strength can include magnitude (or physical loudness) of the audio signal, such as a root mean square (RMS) loudness, average loudness, or peak loudness, over a time period (e.g., one or more audio frames) of the input audio signal. Additionally or alternatively, the strength can include a perceptual loudness, which can be determined by applying an A-weighting, or Loudness K-weighted relative to full scale (LKFS) to the audio signal. In one aspect, the strength is a measure of both magnitude and perceptual loudness.

The magnitude and loudness calculation block can be performed on the audio signal prior to spatialization and does not have or require a 'look ahead'. This can prevent the introduction of additional latency to the system.

Spatializer 34 can include a draw away curve calculation block 24. This block can determine a relationship between a) the strength of the audio signal as perceived by a listener, and b) distance between the sound source and a listener in a virtual space, based on one or more acoustic characteristics of the virtual space. This can be an 'initial' or 'baseline' draw-away curve that is determined based on algorithms that mimic physical acoustic behavior. It should be understood that a 'draw-away curve' is a curve that describes a relationship between strength of the audio signal, as perceived by a listener, and the distance between the sound source and the listener (see FIG. 5 for an example draw-away curve).

A 'draw-away curve' can be modeled with a direct component that describes sound energy that travels directly from a sound source to the listener, and a reverberant component, which describes sound energy from the sound source that reflects off one or more surfaces in the listening environment before reaching the user. Additionally or alternatively, the draw-away curve calculation block can determine attenuation of the audio signal as a function of distance between the sound source and the listener in the virtual space. With this relationship between attenuation and distance, the draw-away curve (strength vs. distance) can easily be determined, by applying the strength of the audio signal to the attenuation. Similarly, the relationship between attenuation and distance can be extracted from the draw-away curve by taking the ratio of strength to distance at each distance. Thus, the two relationships (strength relative to distance and attenuation relative to distance) can be used interchangeably in aspects of the present disclosure.

As mentioned above, the draw-away curve calculation block can use acoustic characteristics of the virtual space to determine a baseline draw-away curve (or attenuation vs. distance) of the audio signal based on natural sound behavior. The acoustic characteristics can include, for example, geometry that defines an enclosed space, for example, one or more walls, a ceiling, or a volume of the virtual space.

The acoustic characteristics can indicate if the virtual space is an open field (e.g., without walls or ceilings). In a small enclosed space, a reverberant component of the relationship may dominate the relationship. In such a case, the steady state reverb component shown in FIG. 4 would be relatively high.

Conversely, while in a large or open space, a direct component may be dominant and the reverb component may be negligible. In such a case, the draw-away curve may follow a direct sound component trajectory shown in FIG. 4.

Referring back to FIG. 1, the acoustic characteristics can include a reverberation time, sound absorption parameters or scattering parameters of the virtual space. Reverberation time can define an amount of amount of time required for a sound to decay a certain amount, e.g., 10 dB (RT10), 20 dB (RT20), 30 dB (RT30), 60 dB (RT60), etc., after the sound has stopped. Absorption parameters describe an amount of sound absorption that is present in the virtual space. For example, if the virtual space is a concert hall filled with people, the people can be treated as a layer of sound absorption material. Absorption material absorbs sound as it bounces off surfaces in the virtual space, the greater the absorption material, the faster the reverberant component of a draw-away curve will decay. Soft, rough, and porous materials (e.g., foam) can provide more absorption, while hard smooth surfaces can provide less absorption. In addition, different structures in the virtual space can scatter a sound into different directions.

In one aspect, the acoustic characteristics can define how many sound sources are present in the virtual space. For example, if many are present, then the system can further reduce strength of the sound source, to account for additional loudness from the other sound sources.

In one aspect, the acoustic characteristics can be provided in environmental metadata 40. The environmental metadata can be associated with a predetermined audio asset (e.g., an audio file, a teleconference, a soundtrack for a movie, etc.) or a live interactive feed (e.g., a teleconference, video game, etc.). The environmental metadata can change over time, for example, to accommodate for changes in the virtual space (e.g., a scene change in a movie or video game).

In one aspect, the relationship between a) the strength of the audio signal, and b) the distance between the sound source and the listener in the virtual space is determined further based on a directivity of the sound source. Directivity of a sound is a measure of how directional a sound is. A sound that is omni-directional puts out sounds in all directions (having a polar pattern like a sphere). A person talking tends to radiate sounds in a hemispherical pattern (half-sphere). If a sound is very directional (having an elongated or narrow polar pattern), then the direct component of the sound source's draw-away curve can dominate over the reverberant component, for farther distances. For example, the draw-away curve at FIG. 4 might have a 'knee' or bend farther to the right if the sound has a greater directivity. Referring back to FIG. 1, the sound source directivity can be included in sound source metadata 38.

Figure 4:
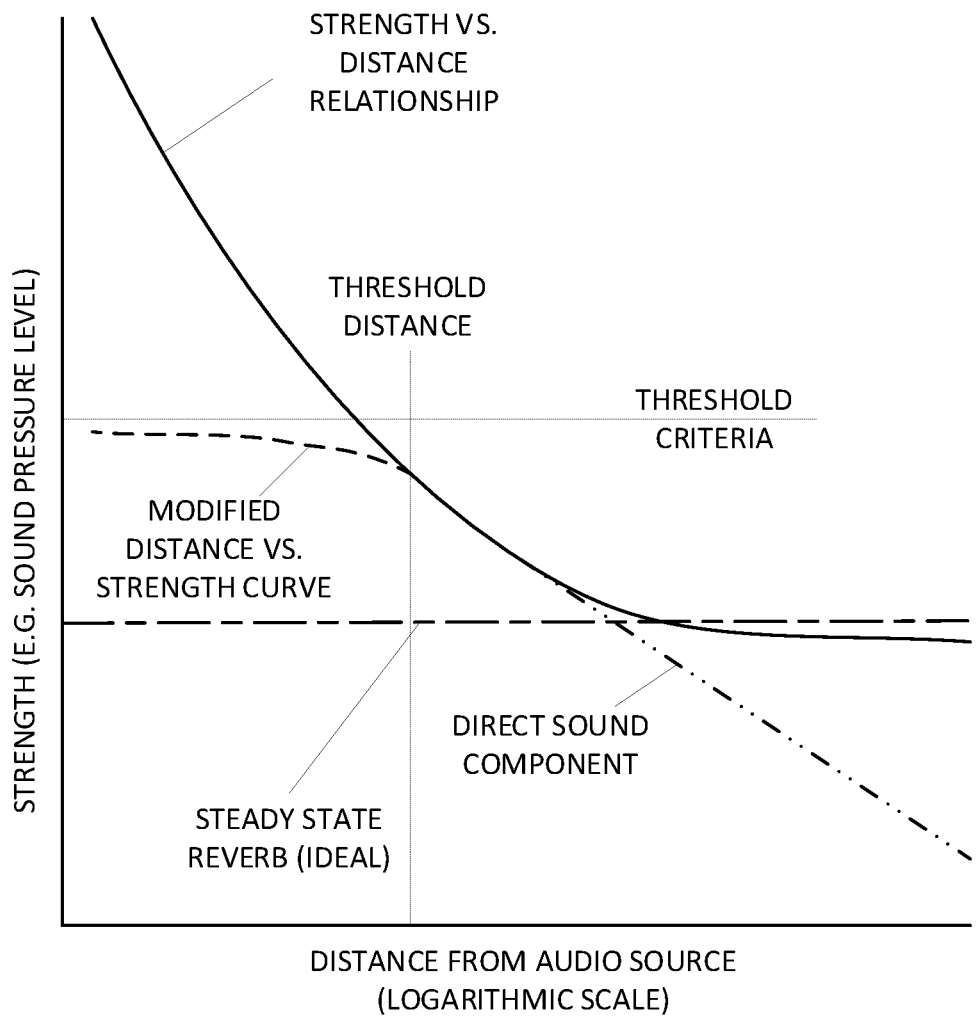
FIGS. 4 and 5 illustrate example draw-away curves, and example modifications to the draw-away curves.

Draw away curve calculation block 24 can determine a modified relationship based on the strength of the audio signal calculated at block 22. The modified relationship can be determined by decreasing or increasing strength of the audio signal at one or more distances between the sound source and the listener as provided by the baseline draw-away curve or attenuation-distance relationship. As shown in FIG. 4, the baseline relationship can be modified by reducing the strength of the audio signal at one or more distances to suppress the strength of the audio signal below a threshold criteria.

For example, if a strength of the baseline distance vs. strength relationship meets a threshold criteria (which can be a threshold loudness level), then the system can taper or compress the draw-away curve, resulting in the modified distance vs. strength curve shown in FIG. 4 that is deemed to be at a safe level or below the threshold criteria. The threshold criteria can be pre-determined based on known hardware limits (e.g., speaker limits) and/or preferred levels for a human ear. The modified curve does not exceed the threshold criteria, thereby protecting system hardware (e.g., speakers) and presenting pleasant audio levels to a listener.

In one aspect, the draw-away curve is only modified at a threshold distance or proximity to the sound source. In this manner, the perceived loudness of the sound can increase and decrease naturally with respect to distance from the sound source (using the baseline draw-away curve to attenuate the audio signal) until the listener gets within the threshold distance. At that point, if the user gets closer to the source, the audio signal of the sound source can be attenuated at a level specified by the modified draw-away curve.

Figure 5:
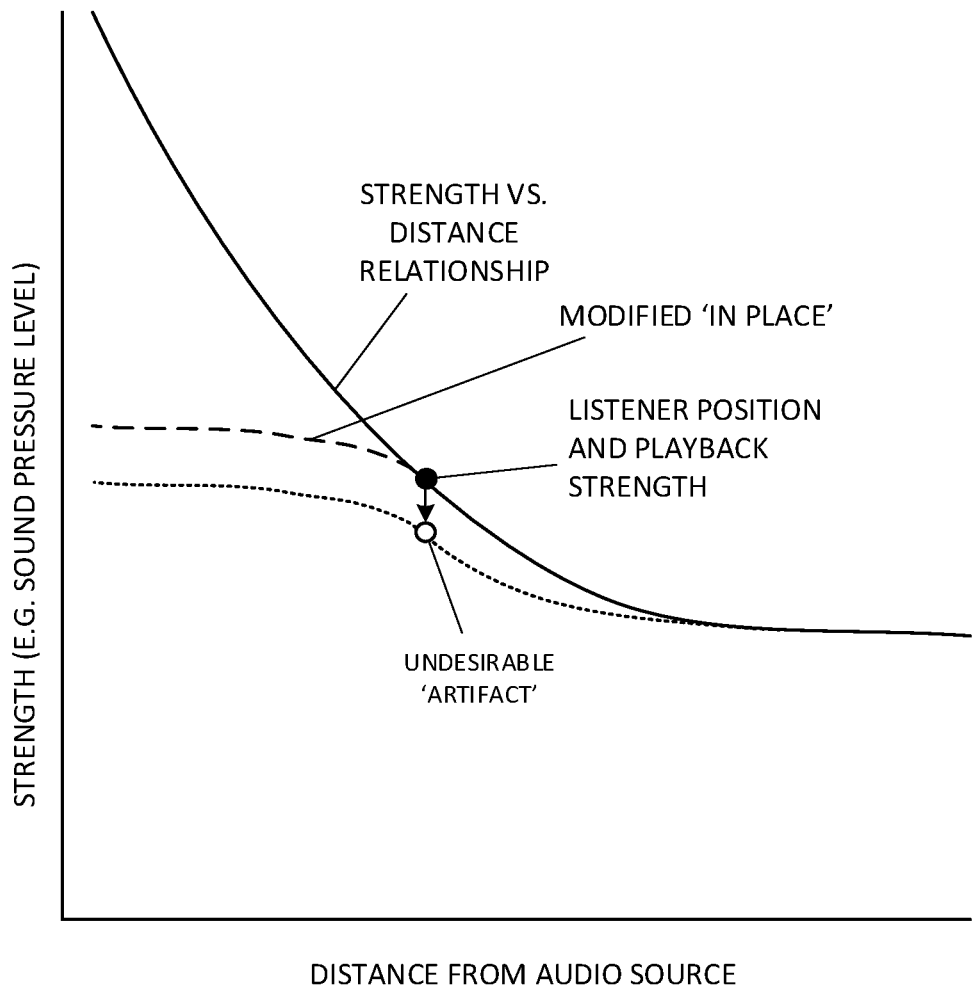

In one aspect, the modified relationship does not change a current strength of the audio signal at the current listener position, but does change the strength of the audio signal at farther and/or closer positions from the sound source in the virtual space. For example, FIG. 5 shows a listener position in virtual space, and current playback strength of the audio signal. The strength vs. distance relationship is modified dynamically, but if the modified relationship changes the current strength of the audio signal at the current listener position, this can result in an undesirable audible artifact (a loudness jump) heard by the listener. Thus, the system can modify the relationship 'around' the listener, at farther and/or closer positions from the sound source, while maintaining the current loudness or attenuation level of the audio signal at the user's current location.

In one aspect, the modified relationship is determined further based on a type of the sound source. For example, if the sound source is a flute, the system can assume that the loudness of the flute will not greatly increase. Thus, the system does not have to modify or suppress the draw-away curve of the flute much. On the other hand, if the sound source is a trumpet, or another sound source type that is deemed to have potential for large variations in loudness, the draw-away curve can be more aggressively modified or suppressed. In other words, even if the strength of the sound source is not currently high, the type of sound source might indicate that a sudden increase in loudness and magnitude of the audio signal is a possible, and the system can protect against such a possibility, by modifying the draw-away curve accordingly. Sound source type, or a loudness volatility indicator, can be provided in sound source metadata 38.

In one aspect, the modified relationship is determined further based on a number of sound sources that are present in virtual space, and/or the strength of the other sound sources. For example, multiple sound sources are present in the virtual space, the system can determine the modified draw-away curve to account for loudness of the other sound sources, to maintain loudness heard by the user below the threshold criteria. In one aspect, the modified relationship is determined further based on a movement parameters (e.g., speed) of the listener and/or sound source. For example, it may be more computationally efficient to skip recalculation of draw-away curves for a source that is moving rapidly away from a listener, or it may be necessary to calculate a flatter (gain increasing less as distance decreases) draw-away curve if a loud sound source is moving rapidly towards a listener.

At draw away attenuation block 26, the system can determine a modified audio signal (and/or strength thereof) based on the modified relationship and a current distance between the sound source and the listener in the virtual space. In other words, the system can apply the modified draw-away curve to the audio signal resulting in a modified audio signal having a different strength at some distances from the audio source as compared to the baseline relationship/draw-away curve. For example, the system can apply an inverse of the modified relationship to the current distance between the sound source and the listener in the virtual space, to determine the strength of the modified audio signal. In another example, the system can tune a gain/attenuator that is applied to the input audio signal resulting in the modified audio signal. In such a case, the system can apply the attenuation level that corresponds to the current distance between the sound source and the listener to the audio signal, such that the strength of the modified audio signal is in accord with strength indicated by the modified relationship at the listener's relative distance from the sound source.

The current distance between the sound source and the listener in the virtual space can be determined based on user position feedback 36 and a position of the sound source in the virtual space. Sound source location can be provided in sound source metadata 38 and/or environmental metadata 40. The position and orientation of both the sound source and the user can change over time in the virtual space, tracked by the system.

User position feedback 36 can be provided through various means. For example, user speakers 30 can have sensors 31 that detect movement and position of a user. The sensors can include and combination of a) cameras that generate images that are processed using visual odometry to determine head movements, orientation, and position, b) an inertial measurement unit (IMU) that can include accelerometers and gyroscopes, and c) 3D cameras, and/or other technology. The sensors 31 are shown to be integral to the head worn system which can provide the positional feedback to the audio processing system 20, in one aspect, without external sensors. In other words, the user position feedback can be generated through 'inside-out' tracking of the user position. Additionally or alternatively, such sensors can also be located in the physical vicinity of the user external to the head worn system, to track the user's head position and orientation. Thus, a user's head position and orientation can be tracked continuously.

The modified audio signal (e.g., the attenuated audio signal determined based on the modified relationship) can then be spatialized at binaural processor block 28, based on a current listener position (e.g., provided by user position feedback 36) and current sound source position in the virtual space, with one or more head related transfer functions (HRTF). This spatial rendering can produce a left and right spatialized audio signal, that, when used to drive a left speaker and a right speaker of a headphone set, are converted to sound that is perceived by the listener to contain the sound source at the current sound source position in the virtual space. For example, the binaural processor can select one or more HRTFs from an HRTF database 29 based on the listener position and orientation (including left ear vs right ear), the sound source position, and apply the one or more HRTFs to the audio signal to produce a left spatialized audio signal, and a right spatialized audio signal.

User speakers 30 can be integrated with different devices such as a headphone set, a head-worn display, or other head-worn speaker system having a left speaker played to a user's left ear and a right speaker played to a user's right ear. Such devices can have speakers that are worn in-ear, over-ear, on-ear, or outside of the ear (e.g., bone conduction speakers).

The system 20 can periodically repeat the process performed by the various blocks, to dynamically generate the various shown outputs and feedbacks. For example, new modified relationships (draw-away curves) can be determined at block 24 for the same sound source over time, for example, depending on how the calculated strength (determined at block 22) of the sound source changes over time. Based on the updated modified relationships, new modified strengths of the sound source's audio signal can be determined at block 26. In other words, as the draw-away curve is modified dynamically, the attenuation of the signal changes accordingly.

In one aspect, multiple sound sources can be present in a virtual space. For example, a first sound source can be a voice of a first speaker and a second sound source can be a voice of a second speaker. As mentioned above, the draw-away curve for each sound source can be modified to account for its own loudness as well as the presence and loudness of other sound sources. Thus, if the second speaker is very loud, the draw-away curve of the first speaker may be modified to account for the second speaker (e.g., by further tapering or compressing the draw-away curve of the first speaker). In such a case, the draw-away curve of the second speaker would also be modified to account for loudness of the second speaker and the first speaker as well.

Figure 2:
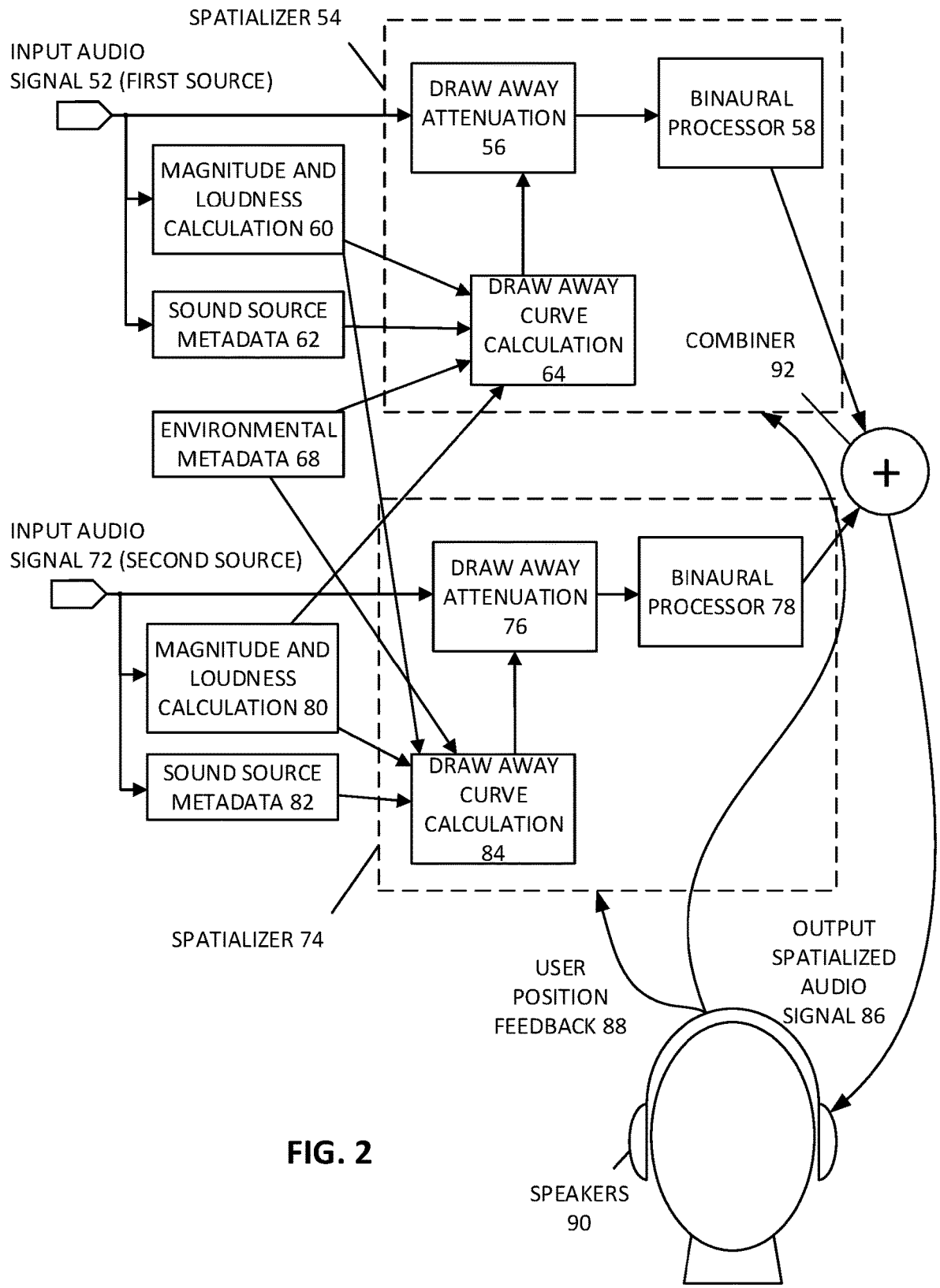
FIG. 2 shows a process and system for spatial audio processing that modifies a draw-away curve with more than one sound source, according to one aspect.

For example, FIG. 2 shows an input audio signal 52 of a first sound source and an input audio signal 72 of a second sound source. An initial draw-away curve can be determined for the first sound source and second sound source (at blocks 64, 84) irrespective of each other, based on the acoustic characteristics of the room (e.g., room geometry, volume, reverberation time, absorption and scattering parameters, and/or number of sound sources), as described above in discussion of FIG. 1. The acoustic parameters can be included in environmental metadata 68. The strength of the first source can be calculated at block 60 and used at block 84 to modify the draw-away curve of the second sound source. Similarly, the strength of the second source can be used to modify the draw-away curve of the first sound source. Thus, the draw away curve of each sound source can be modified based on its own strength, as well as strength of other sound sources in the listening area, and other factors already described above.

Draw-away attenuation blocks 56 and 76 can use the respective draw-away curves to attenuate or modify the respective sound sources. Binaural processors 58 and 78 can spatialize the respective sound sources into respective spatialized left and right audio channels.

A combiner 92 can combine the spatialized left audio channels of the first and second sound source into a single left audio channel. Similarly, the combiner can combine the spatialized right audio channels of the first and second sound source into a single right audio channel. The output spatialized audio signals 86, comprising the single left audio channel and single right audio channel, can be used to drive the head-worn speakers 90.

Figure 3:
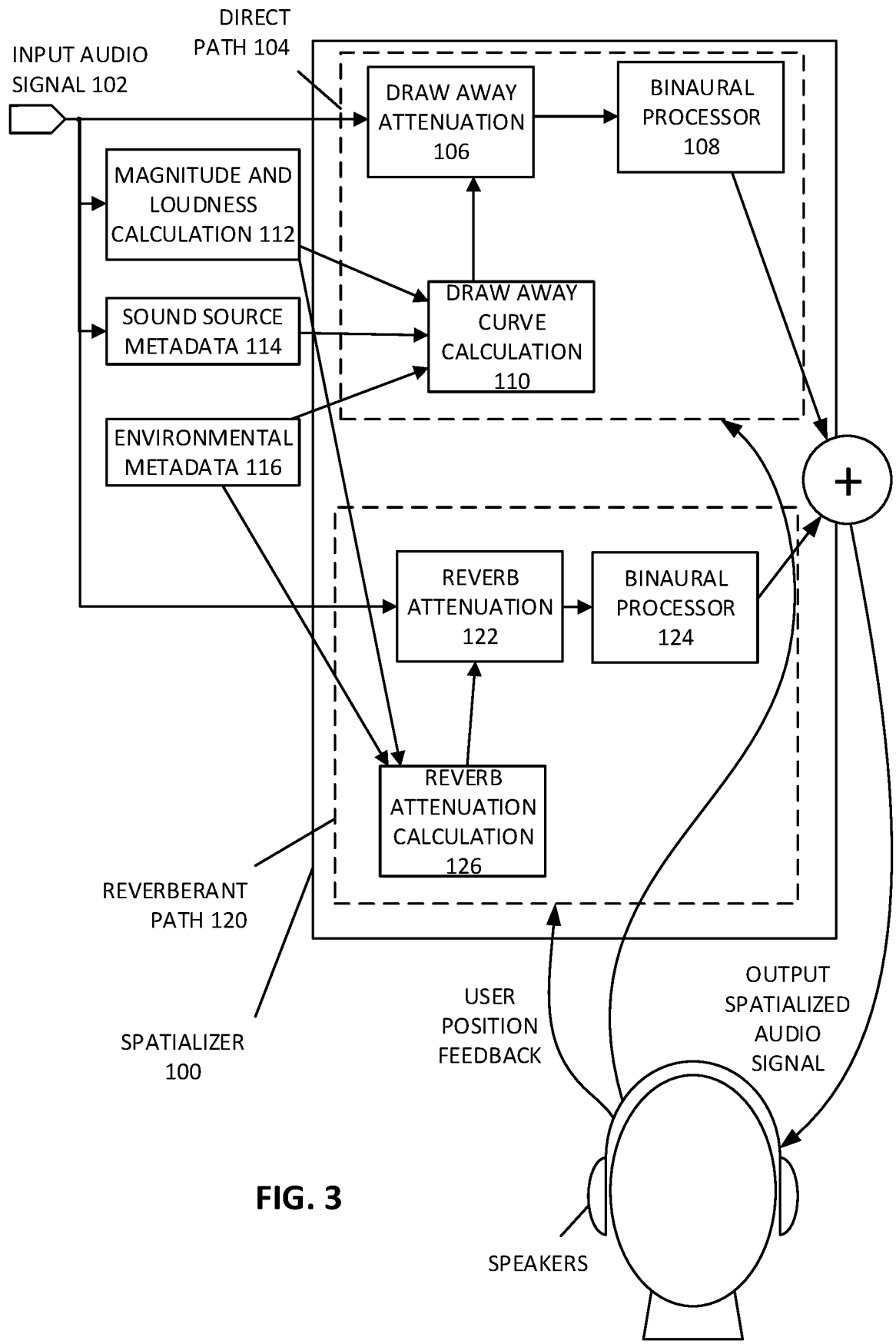
FIG. 3 shows a process and system that includes separate processing paths for direct and reverberant components of an audio signal, according to one aspect.

In one aspect, a direct component and a reverberant component of an input audio signal 102 of a sound source can be processed in separate paths. For example, FIG. 3 shows a spatializer 100 that has a direct processing path 104 and a reverberant processing path 120.

A draw away curve calculation block 110 determines a relationship between a) strength of a direct component of the input audio signal of a sound source as perceived by a listener, and b) distance between the sound source and the listener in a virtual space, based on one or more acoustic characteristics of the virtual space. The acoustic characteristics, which are described in other sections, can be provided through environmental metadata 116.

A magnitude and loudness calculation block 112 calculates strength of the audio signal of the sound source. This can include any combination of physical strength (magnitude) or perceived strength (loudness) as described in other sections.

At block 110, the system can determine a modified relationship of the direct component, based on the calculated strength of the audio signal determined at block 112. The modified relationship can use the draw-away curve that was previously determined as a baseline, and then decrease or increase the strength of the direct component of the draw-away curve at one or more distances between the sound source and the listener, to determine the modified draw-away curve.

Draw away attenuation block 106 can determine a modified direct component (and/or strength thereof) based on the modified relationship of the direct component (determined at block 110) and a current distance between the sound source and the listener in the virtual space. The current distance can be determined based on user position feedback, and sound source position provided in sound source metadata 114, or environmental metadata 116, as described in other sections. This modified direct component can be generated as a result of applying the modified relationship to the direct component, in the same manner as how the modified audio signal is generated from the audio signal with a modified relationship, as described in other sections.

Referring to the reverberant path, the system can, at block 126, determine a strength of a reverberant component of the sound source (or a steady state reverberation of the virtual space) based on the one or more acoustic characteristics of the virtual space.

As mentioned above, in some cases, for example, where the room is very small and/or very reverberant, the reverberant component of the sound may dominate the direct component such that regardless of distance from the sound source object, the sound strength appears to remain unchanged, which can reduce the effect of spatial audio that is location dependent. The system, however, can modify the reverberant component of an audio signal independent of the direct component. The system can calculate an attenuation level of the reverberant component, based on the strength of the audio signal calculated at block 112, and then attenuate the reverberant component of the signal 102 at block 122 with the calculated attenuation level at block 126. In this manner, if the reverberation in an acoustic environment is too great, then the reverberation of the signal can be reduced, independent of the direct component, to provide the effect of loudness diminishing over distance.

The system can spatialized the reverberant and direct components, respectively, at blocks 108, 124, and combine the spatialize signals, as described in other sections. The resulting left and right spatialized audio signals can be used to drive a left speaker and a right speaker of a headphone set, where the signals are converted to sound that is perceived by the listener to contain the sound source and the second sound source at respective positions in the virtual space.

Figure 6:
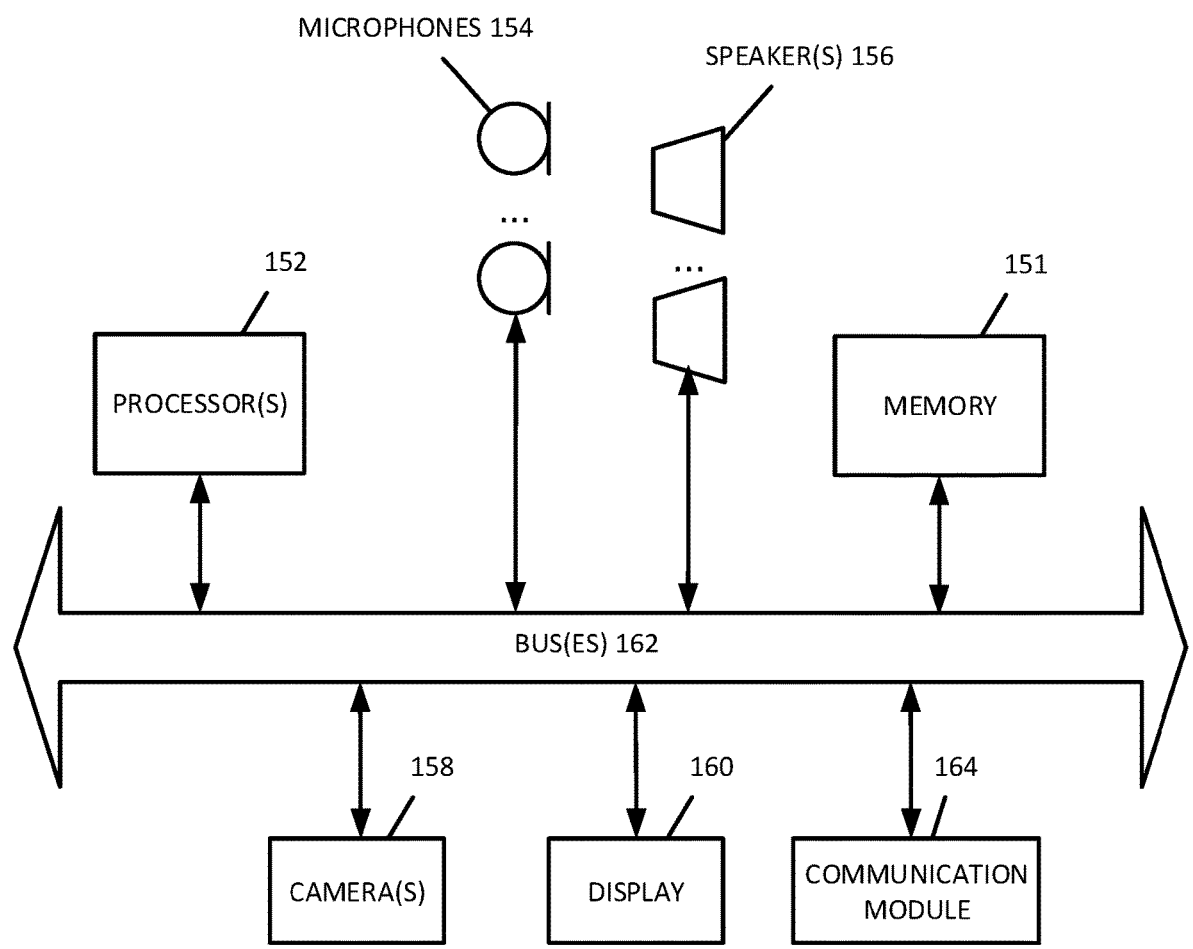
FIG. 6 illustrates an example of audio system hardware, according to one aspect.

FIG. 6 shows a block diagram of audio processing system hardware, in one aspect, which may be used with any of the aspects described herein (e.g., headphone set, mobile device, media player, or television). This audio processing system can represent a general purpose computer system or a special purpose computer system. Note that while FIG. 6 illustrates the various components of an audio processing system that may be incorporated into headphones, speaker systems, microphone arrays and entertainment systems, it is merely one example of a particular implementation and is merely to illustrate the types of components that may be present in the audio processing system. FIG. 6 is not intended to represent any particular architecture or manner of interconnecting the components as such details are not germane to the aspects herein. It will also be appreciated that other types of audio processing systems that have fewer components than shown or more components than shown in FIG. 6 can also be used. Accordingly, the processes described herein are not limited to use with the hardware and software of FIG. 6.

As shown in FIG. 6, the audio processing system 150 (for example, a laptop computer, a desktop computer, a mobile phone, a smart phone, a tablet computer, a smart speaker, a head mounted display (HMD), a headphone set, or an infotainment system for an automobile or other vehicle) includes one or more buses 162 that serve to interconnect the various components of the system. One or more processors 152 are coupled to bus 162 as is known in the art. The processor(s) may be microprocessors or special purpose processors, system on chip (SOC), a central processing unit, a graphics processing unit, a processor created through an Application Specific Integrated Circuit (ASIC), or combinations thereof. Memory 151 can include Read Only Memory (ROM), volatile memory, and non-volatile memory, or combinations thereof, coupled to the bus using techniques known in the art. Camera 158 and display 160 can be coupled to the bus.

Memory 151 can be connected to the bus and can include DRAM, a hard disk drive or a flash memory or a magnetic optical drive or magnetic memory or an optical drive or other types of memory systems that maintain data even after power is removed from the system. In one aspect, the processor 152 retrieves computer program instructions stored in a machine readable storage medium (memory) and executes those instructions to perform operations described herein.

Audio hardware, although not shown, can be coupled to the one or more buses 162 in order to receive audio signals to be processed and output by speakers 156. Audio hardware can include digital to analog and/or analog to digital converters. Audio hardware can also include audio amplifiers and filters. The audio hardware can also interface with microphones 154 (e.g., microphone arrays) to receive audio signals (whether analog or digital), digitize them if necessary, and communicate the signals to the bus 162.

Communication module 164 can communicate with remote devices and networks. For example, communication module 164 can communicate over known technologies such as Wi-Fi, 3G, 4G, 5G, Bluetooth, ZigBee, or other equivalent technologies. The communication module can include wired or wireless transmitters and receivers that can communicate (e.g., receive and transmit data) with networked devices such as servers (e.g., the cloud) and/or other devices such as remote speakers and remote microphones.

It will be appreciated that the aspects disclosed herein can utilize memory that is remote from the system, such as a network storage device which is coupled to the audio processing system through a network interface such as a modem or Ethernet interface. The buses 162 can be connected to each other through various bridges, controllers and/or adapters as is well known in the art. In one aspect, one or more network device(s) can be coupled to the bus 162. The network device(s) can be wired network devices (e.g., Ethernet) or wireless network devices (e.g., WI-FI, Bluetooth). In some aspects, various aspects described (e.g., simulation, analysis, estimation, modeling, object detection, etc.,) can be performed by a networked server in communication with the capture device.

Various aspects described herein may be embodied, at least in part, in software. That is, the techniques may be carried out in an audio processing system in response to its processor executing a sequence of instructions contained in a storage medium, such as a non-transitory machine-readable storage medium (e.g. DRAM or flash memory). In various aspects, hardwired circuitry may be used in combination with software instructions to implement the techniques described herein. Thus the techniques are not limited to any specific combination of hardware circuitry and software, or to any particular source for the instructions executed by the audio processing system.

In the description, certain terminology is used to describe features of various aspects. For example, in certain situations, the terms "analyzer", "separator", "renderer", "estimator", "combiner", "synthesizer", "controller", "localizer", "spatializer", "component," "unit," "module," "logic", "extractor", "subtractor", "generator", "optimizer", "processor", "mixer", "detector", "calculator", and "simulator" are representative of hardware and/or software configured to perform one or more processes or functions. For instance, examples of "hardware" include, but are not limited or restricted to an integrated circuit such as a processor (e.g., a digital signal processor, microprocessor, application specific integrated circuit, a micro-controller, etc.). Thus, different combinations of hardware and/or software can be implemented to perform the processes or functions described by the above terms, as understood by one skilled in the art. Of course, the hardware may be alternatively implemented as a finite state machine or even combinatorial logic. An example of "software" includes executable code in the form of an application, an applet, a routine or even a series of instructions. As mentioned above, the software may be stored in any type of machine-readable medium.

Some portions of the preceding detailed descriptions have been presented in terms of algorithms and symbolic representations of operations on data bits within a computer memory. These algorithmic descriptions and representations are the ways used by those skilled in the audio processing arts to most effectively convey the substance of their work to others skilled in the art. An algorithm is here, and generally, conceived to be a self-consistent sequence of operations leading to a desired result. The operations are those requiring physical manipulations of physical quantities. It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of an audio processing system, or similar electronic device, that manipulates and transforms data represented as physical (electronic) quantities within the system's registers and memories into other data similarly represented as physical quantities within the system memories or registers or other such information storage, transmission or display devices.

The processes and blocks described herein are not limited to the specific examples described and are not limited to the specific orders used as examples herein. Rather, any of the processing blocks may be re-ordered, combined or removed, performed in parallel or in serial, as necessary, to achieve the results set forth above. The processing blocks associated with implementing the audio processing system may be performed by one or more programmable processors executing one or more computer programs stored on a non-transitory computer readable storage medium to perform the functions of the system. All or part of the audio processing system may be implemented as, special purpose logic circuitry (e.g., an FPGA (field-programmable gate array) and/ or an ASIC (application-specific integrated circuit)). All or part of the audio system may be implemented using electronic hardware circuitry that include electronic devices such as, for example, at least one of a processor, a memory, a programmable logic device or a logic gate. Further, processes can be implemented in any combination hardware devices and software components.

While certain aspects have been described and shown in the accompanying drawings, it is to be understood that such aspects are merely illustrative of and not restrictive on the broad invention, and the invention is not limited to the specific constructions and arrangements shown and described, since various other modifications may occur to those of ordinary skill in the art. For example, the features relating to beamforming, multiple microphones, and spatializing that are described in relation to FIG. 1 can also be implemented in aspects described in relation to FIG. 2. and/or FIG. 3. Similarly, the echo cancelation of FIG. 2 can be implemented in the aspect shown in FIG. 3, as should be understood by one skilled in the art. The description is thus to be regarded as illustrative instead of limiting.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A method comprising:
   determining a first relationship, based on one or more acoustic characteristics of a virtual space, between a) strength of an audio signal of a sound source as perceived by a listener, and b) distance between the sound source and the listener in the virtual space;
   determining a strength of the audio signal of the sound source;
   determining a second relationship between a) the strength of the audio signal of the sound source as perceived by the listener, and b) the distance between the sound source and the listener in the virtual space that is different from the first relationship, based on the determined strength of the audio signal, by decreasing or increasing the strength of the audio signal as perceived by the listener at one or more distances between the sound source and the listener as defined by the first relationship;
   determining a strength of a modified audio signal based on the second relationship and a current distance between a current position of the sound source and a current position of the listener in the virtual space; and
   spatializing the modified audio signal, based on the current position of the listener and the current position of the sound source in the virtual space, with a head related transfer function, resulting in a left and right spatialized audio signal, that, when used to drive a left speaker and a right speaker of a headphone set, are converted to sound that is perceived by the listener to contain the sound source at the current position of the sound source in the virtual space.

2. The method of claim 1, wherein the one or more acoustic characteristics includes a geometry that defines an enclosed space, including one or more walls, a ceiling, or a volume of the virtual space.

3. The method of claim 1, wherein the one or more acoustic characteristics includes reverberation time of the virtual space.

4. The method of claim 1, wherein the one or more acoustic characteristics indicates an open area without walls or ceilings.

5. The method of claim 1, wherein the one or more acoustic characteristics includes sound absorption or scattering parameters of the virtual space.

6. The method of claim 1, wherein the one or more acoustic characteristics includes definition of how many sound sources are present in the virtual space.

7. The method of claim 1, wherein the first relationship between a) the strength of the audio signal of the sound source as perceived by the listener and b) the distance between the sound source and the listener in the virtual space is further determined based on a directivity of the sound source.

8. The method of claim 1, wherein the method is repeated periodically to dynamically determine additional relationships and additional modified audio signals over time.

9. The method of claim 1, wherein the second relationship does not change a current strength of the audio signal as perceived at the current position of the listener, and does change the strength of the audio signal as perceived at farther or closer positions from the sound source in the virtual space, when the second relationship is used to determine the strength of the modified audio signal.

10. The method of claim 1, wherein determining the second relationship is further based on a type of the sound source, movement parameters of the listener or the sound source, or a number of sound sources in the virtual space.

11. The method of claim 1, wherein determining the strength of the modified audio signal includes a) applying an inverse of the second relationship to the current distance between the sound source and the listener in the virtual space, to determine the modified strength at the current distance, or b) applying an attenuation that corresponds to the current distance between the sound source and the listener to the audio signal.

12. The method of claim 1, wherein the strength of the audio signal is one of, or a combination of: a physical loudness of the audio signal, and a perceptual loudness.

13. The method of claim 12, wherein the physical loudness is a measure of one or more of the following: a root mean squared (RMS) loudness, an average loudness, or a peak loudness, over one or more time frames of the audio signal.

14. The method of claim 12, wherein the perceptual loudness is a measure of one or more of the following: A-weighting loudness, or Loudness K-weighted relative to full scale (LKFS).

15. The method of claim 1, wherein determining the first relationship includes calculating a draw-away curve of the sound source, the draw-away curve having a) a direct sound component, and b) a reverberant component.

16. The method of claim 1, wherein determining the second relationship includes tapering or compressing the first relationship beyond but, not prior, to a threshold proximity to the sound source.

17. The method of claim 1, wherein determining the second relationship includes reducing the strength of the audio signal as perceived by the listener at one or more distances to maintain the strength of the audio signal, or a combined strength of multiple audio signals of multiple sound sources, below threshold criteria that is specified based on protection of a human ear, or a hardware limit.

18. The method of claim 1, further comprising:
determining a third relationship between a) strength or attenuation of a second audio signal of a second sound source as perceived by the listener, and b) distance between the second sound source and the listener in the virtual space, based on the one or more acoustic characteristics of the virtual space;
determining a strength of the second audio signal;
determining a third modified relationship based on the determined strength of the second audio signal, by decreasing or increasing the strength of the second audio signal as perceived by the listener or the attenuation of the second audio signal at one or more distances between the second sound source and the listener as defined by the third relationship;
determining a strength of a second modified audio signal based on the third modified relationship and a current distance between a current position of the second sound source and the current position of the listener in the virtual space; and
spatializing the second modified audio signal, based on the current position of the listener and the current position of the second sound source in the virtual space, resulting in second left and right spatialized audio signals that, when combined with the left and right spatialized audio signals, and used to drive the left speaker and the right speaker of the headphone set, are converted to sound that is perceived by the listener to contain the sound source and the second sound source at respective positions in the virtual space.

19. A system for spatializing audio, comprising:
a processor; and
non-transitory memory having stored therein a plurality of instructions, that when executed by the processor, perform the following:
determining a baseline relationship between a) strength of a direct component of an audio signal of a sound source as perceived by a listener, and b) distance between the sound source and the listener in a virtual space, based on one or more acoustic characteristics of the virtual space;
calculating strength of audio signal;
determining, based on the calculated strength of the audio signal, a modified relationship between a) the strength of the audio signal of the sound source as perceived by the listener, and b) the distance between the sound source and the listener in the virtual space that is different from the baseline relationship, by decreasing or increasing the strength of the direct component at one or more distances between the sound source and the listener defined by the baseline relationship;
determining a strength of a modified direct component based on a) the modified relationship of the direct component and b) a current distance between a current position of the sound source and a current position of the listener in the virtual space, resulting in a direct component of the audio signal having an attenuated strength; and
determining a reverberant component of the audio signal, based on the one or more acoustic characteristics of the virtual space;
determining a reverberant attenuation level, based on the calculated strength of the audio signal attenuating the audio signal with the reverberant attenuation level, resulting in a reverberant component with attenuated strength; and spatializing and combining the modified direct component and the reverberant component having the attenuated strength, based on a current listener position and current sound source position in the virtual space, with a head related transfer function, resulting in left and right spatialized audio signals, that, when used to drive a left speaker and a right speaker of a headphone set, are converted to sound that is perceived by the listener to contain the sound source and the second sound source at respective positions in the virtual space.

20. An article of manufacture, comprising:

a processor; and non-transitory memory having stored therein a plurality of instructions, that when executed by the processor, perform the following:

determining, based on one or more acoustic characteristics of the virtual space, a baseline draw-away curve of a sound source that defines strength or attenuation of an audio signal of a sound source relative to a distance between the sound source and the listener in a virtual space;

calculating strength of an audio signal of a sound source;

modifying, based on the calculated strength of the audio signal, the strength or the attenuation of the audio signal relative to the distance between the sound source and the listener in the virtual space defined by the baseline draw-away curve, resulting in a modified draw-away curve that is different than the baseline draw-away curve;

determining a modified audio signal based on the modified draw-away curve and a distance between a current position of the sound source and a current position of the listener in the virtual space; and spatializing the modified audio signal based on a current listener position and current sound source position in the virtual space, with a head related transfer function, resulting in a left and right spatialized audio signal, that, when used to drive a left speaker and a right speaker of a headphone set, are converted to sound that is perceived by the listener to contain the sound source at the current sound source position in the virtual space.

* * * * *